(12) United States Patent
Wang et al.

(10) Patent No.: US 12,202,506 B2
(45) Date of Patent: Jan. 21, 2025

(54) INFORMATION PROCESSING APPARATUS, VEHICLE, AND INFORMATION PROCESSING METHOD

(71) Applicant: Panasonic Intellectual Property Management Co., Ltd., Osaka (JP)

(72) Inventors: Xiaoyu Wang, Tokyo (JP); Yusuke Kanzaki, Kanagawa (JP); Tooru Kameyama, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 304 days.

(21) Appl. No.: 17/944,477

(22) Filed: Sep. 14, 2022

(65) Prior Publication Data
US 2023/0001947 A1 Jan. 5, 2023

Related U.S. Application Data

(63) Continuation of application No. PCT/JP2020/045687, filed on Dec. 8, 2020.

(30) Foreign Application Priority Data

Mar. 17, 2020 (JP) .................................. 2020-046494

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2050/146* (2013.01);
(Continued)

(58) Field of Classification Search
CPC .......... G01D 7/00; B60K 35/10; B60K 35/29; B60K 35/213; B60K 35/00; B60K 35/20;
(Continued)

(56) References Cited

U.S. PATENT DOCUMENTS 5,952,941 A * 9/1999 Mardirossian ........... G08G 1/01
340/936
10,991,344 B2 * 4/2021 Ogawa ................... G09G 3/006
(Continued)

FOREIGN PATENT DOCUMENTS

EP 3 543 769 A1 9/2019
JP 2004-177146 A 6/2004
(Continued)

OTHER PUBLICATIONS

Numazawa, Automotive Electronics In Passenger Cars, 1988, IEEE, p. 11-24 (Year: 1988).*
(Continued)

*Primary Examiner* — McDieunel Marc
(74) *Attorney, Agent, or Firm* — GREENBLUM & BERNSTEIN, P.L.C.

(57) ABSTRACT

An information processing apparatus, a vehicle, and an information processing method each for improving the visibility of an on-board meter panel. Information processing apparatus includes information acquirer that acquires traveling information on traveling of a vehicle including an on-board meter panel; and display pattern changer—that changes a display pattern of the on-board meter panel in accordance with change in the traveling information.

17 Claims, 13 Drawing Sheets

(52) U.S. Cl.
CPC . *B60W 2510/0638* (2013.01); *B60W 2510/20* (2013.01); *B60W 2540/225* (2020.02)

(58) Field of Classification Search
CPC ...... B60K 2360/1876; B60K 2360/151; B60K 2360/149; G08G 1/16; B60W 50/14; B60W 40/09; B60W 2510/20; B60W 2540/225; B60W 2510/0638; B60W 2050/146

See application file for complete search history.

(56) References Cited

U.S. PATENT DOCUMENTS

| 2015/0375620 | A1 | 12/2015 | Tanaka |
| 2020/0047618 | A1 | 2/2020 | Suzuki et al. |

FOREIGN PATENT DOCUMENTS

| JP | 2009-120014 A | 6/2009 |
| JP | 2016-068931 A | 5/2016 |
| JP | 2018-187984 A | 11/2018 |
| JP | 2019-048628 A | 3/2019 |
| JP | 2019-162932 A | 9/2019 |
| JP | 2019-204063 A | 11/2019 |
| WO | 2014//129197 A1 | 8/2014 |

OTHER PUBLICATIONS

Savin et al., On-Board Information and Calculation System for Tram Vehicle, 2008, IEEE, p. 113-116 (Year: 2008).*
Sasaki et al., On-board self-regulating automated vehicle operation system, 1999, IEEE, p. 2298-2302 (Year: 1999).*
Ikeda et al., Sumitomo electric's navigation systems for private automobiles, 1991, IEEE, p. 451-462 (Year: 1991).*
International Search Report issued in International Bureau of WIPO Patent Application No. PCT/JP2020/045687, dated Jan. 26, 2021, along with an English translation thereof.
Notice of the Reasons for Refusal dated Dec. 20, 2022 for Japanese Patent Application No. 2020-046494, along with an English translation thereof.

* cited by examiner

INFORMATION PROCESSING APPARATUS, VEHICLE, AND INFORMATION PROCESSING METHOD

TECHNICAL FIELD

The present disclosure relates to an information processing apparatus, a vehicle, and an information processing method.

BACKGROUND ART

Patent Literature 1 discloses a vehicle instrument that improves the design with a needle of an indicating instrument on an on-board meter panel moving from the minimum scale position to the maximum scale position and then moving back to the minimum scale position when a key switch is turned off.

CITATION LIST

Patent Literature

PTL 1
Japanese Patent Application Laid-Open No. 2004-177146

SUMMARY

Technical Problem

One non-limiting and exemplary embodiment facilitates providing an information processing apparatus, a vehicle, and an information processing method each capable of improving the visibility of an on-board meter panel.

Solution to Problem

An information processing apparatus according to an embodiment of the present disclosure includes: a memory device that stores a program, one or more processors that execute the program, wherein, by executing the program, the one or more processors acquire traveling information on traveling of a vehicle including an on-board meter panel; and change a display pattern of the on-board meter panel in accordance with change in the traveling information.

A vehicle according to an embodiment of the present disclosure includes the information processing apparatus described above.

An information processing method performed by one or more processors, the method according to an embodiment of the present disclosure includes: acquiring traveling information on traveling of a vehicle including an on-board meter panel; determining whether to change a display pattern of the on-board meter panel based on the traveling information; and changing the display pattern of the on-board meter panel when the display pattern of the on-board meter panel needs to be changed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

Embodiment

Figure 1:
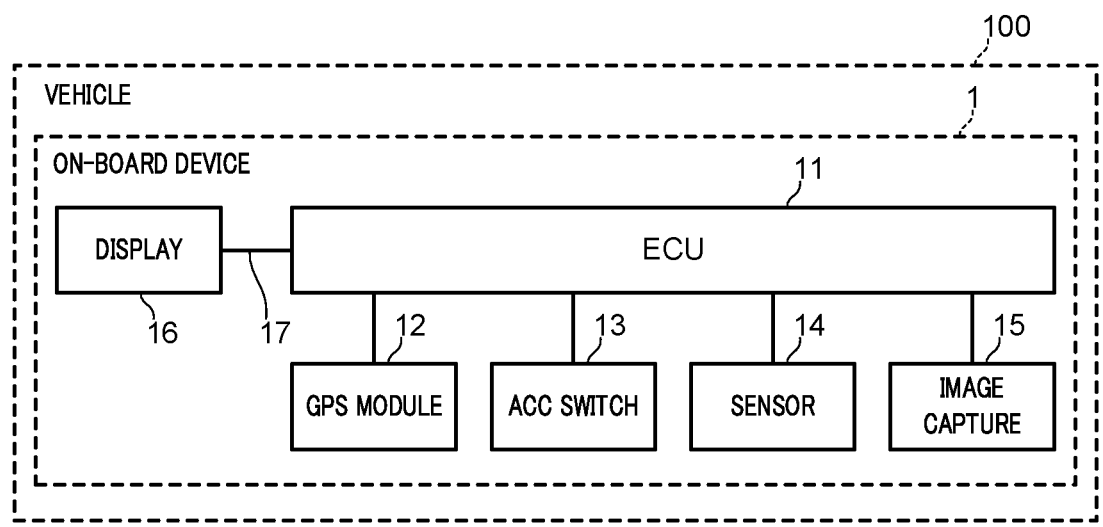
FIG. 1 illustrates an exemplary configuration of a vehicle including an information processing apparatus according to an embodiment of the present disclosure.

FIG. 1 illustrates an exemplary configuration of a vehicle including an information processing apparatus according to an embodiment of the present disclosure. Vehicle 100 is, for example, a passenger car, freight car, bus, and shared taxi. On-board device 1 of vehicle 100 includes electronic control unit (ECU) 11, global positioning system (GPS) module 12, accessory (ACC) switch 13, sensor 14, image capture 15, and display 16, for example. These devices are connected to controller area network (CAN) 17, which is an in-vehicle network, and communicably connected to ECU 11. Note that on-board device 1 includes, in addition to those devices, a car navigation system, audio equipment, an inverter, a motor, and auxiliary equipment, for example.

ECU 11 is an electronic control unit that collects vehicle information from GPS module 12, ACC switch 13, sensor 14, and image capture 15, for example, and performs various control processes related to predetermined functions of vehicle 100. ECU 11 is, for example, a motor ECU, hybrid ECU, engine ECU, and the like. The vehicle information includes, for example, vehicle position information, speed information, vehicle status information, and captured image information. The vehicle position information is information indicating the current position of vehicle 100, and is, for example, information indicating the latitude and longitude at which vehicle 100 is traveling. The vehicle position information is transmitted from, for example, GPS module 12 and the car navigation system. The speed information is information indicating the current speed of vehicle 100 transmitted from a vehicle speed sensor. The vehicle status information is, for example, a signal indicating whether ACC switch 13 is ON or OFF. In addition to this, the vehicle status information includes a windshield wiper operation status, defogger status, accelerator position, brake depression, steering volume of the steering wheel, and information obtained from advanced driver-assistance systems (ADAS). The ADAS is a system that supports a driver's driving operation in order to enhance the convenience of road traffic. The captured image information is information indicating contents of an image captured by image capture 15. The captured image information includes time information indicating the time of image generation.

GPS module 12 receives a GPS signal transmitted from satellite, measures the position of vehicle 100 on which GPS module 12 is mounted, and inputs the vehicle position information, which is the positioning result, to ECU 11 through CAN 17.

ACC switch 13 is a switch that turns on and off accessory power supply of vehicle 100 in response to an operation of an occupant. For example, ACC switch 13 turns on and off the accessory power supply in response to an operation to a power switch provided on an instrument panel near the steering wheel of the driver's seat in the vehicle compartment. The power switch is, for example, a button switch for operating an ignition (not illustrated). An output signal of ACC switch 13 is exemplary information indicating the start and stop of vehicle 100. To be more specific, when the output signal of ACC switch 13 turns an ON signal from an OFF signal, it indicates the start of vehicle 100, and when the output signal of ACC switch 13 turns the OFF signal from the ON signal, it indicates the stop of vehicle 100. ACC switch 13 is communicatively connected to ECU 11, for example, through CAN 17, and the status signal (ON signal/OFF signal) is transmitted to ECU 11.

Sensor 14 is, for example, a sensor detecting a voltage applied to the inverter, a sensor detecting a voltage applied to the motor, a sensor detecting a vehicle speed, a sensor detecting an accelerator position, a sensor detecting a steering volume of the steering wheel, and a sensor detecting a brake operation amount. In addition, sensor 14 may include, for example, an acceleration sensor detecting acceleration of vehicle 100, and an angular velocity sensor (gyroscope) detecting angular velocity of vehicle 100. Detection information outputted from sensor 14 is taken into ECU 11 through CAN 17.

Image capture 15 is a camera including an image sensor such as a charge coupled device (CCD) and complementary metal oxide semiconductor (CMOS). Image capture 15 includes, for example, an inside image capture that captures an image of the inside of vehicle 100 and an outside image capture that captures an image of the outside of vehicle 100.

The inside image capture is placed at a position where faces of occupants of a driver's seat, a passenger's seat, a rear seat of vehicle 100, for example, can be captured. Such a position includes, for example, a dashboard of vehicle 100, an instrument panel of the driver's seat, and the ceiling of vehicle 100. Vehicle 100 is not necessarily provided with a single inside image capture, and may be provided with a plurality of inside image captures. The inside image capture outputs captured image information indicating a captured inside image of the vehicle.

The outside image capture may be an omni-directional camera that captures an image of the scenery around the vehicle, and a panoramic camera, for example. The scenery around the vehicle is, for example, the scenery in front of vehicle 100, the scenery on the side of vehicle 100 (driver's seat door side of vehicle 100 or passenger's seat door side of vehicle 100), and the scenery behind vehicle 100. The scenery includes, for example, a road on which the vehicle is traveling, an object present on the road, a sidewalk facing the road, and an object present on the sidewalk. The object present on the road is, for example, a vehicle, building, structure (advertisement, road sign, traffic light, telegraph pole, etc.), person, and animal. The object present on the sidewalk is, for example, a pedestrian, animal, bicycle, structure, and fallen object. The outside image capture is placed at a position where the scenery outside the vehicle can be captured, for example. Such a position includes a front grille, side mirror, ceiling, and rear bumper, for example. The outside image capture outputs captured image information indicating a captured outside image of the vehicle.

Display 16 is, for example, an on-board meter panel provided in front of the driver's seat, and a head-up display that displays an image on the windshield.

Figure 2:
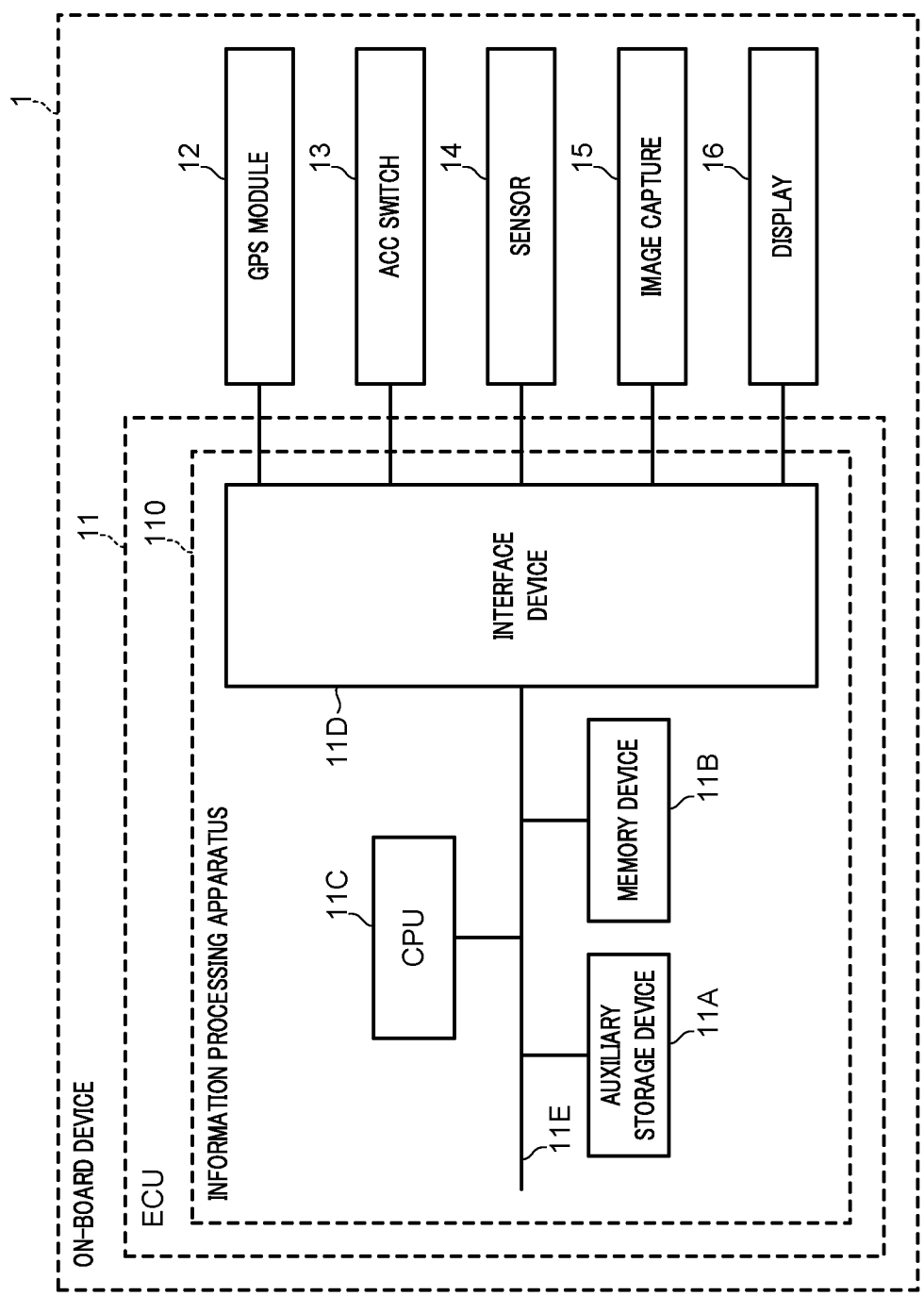
FIG. 2 illustrates an exemplary hardware configuration of an electronic control unit (ECU)

Next, an exemplary hardware configuration of the ECU will be described with reference to FIG. 2. FIG. 2 illustrates the exemplary hardware configuration of the ECU. ECU 11 includes auxiliary storage device 11A, memory device 11B, CPU 11C, and interface device 11D. These compose information processing apparatus 110 and are connected to each other through bus line 11E.

Auxiliary storage device 11A is a hard disk drive (HDD) or flash memory that stores a file and data necessary for processing in ECU 11. When a program starting indication is present, memory device 11B reads a program from auxiliary storage device 11A and stores the program. CPU 11C executes the program stored in memory device 11B and implements various functions of ECU 11 according to the program. Interface device 11D is an interface that connects CPU 11C, for example, to image capture 15, sensor 14, etc. through CAN 17.

Figure 3:
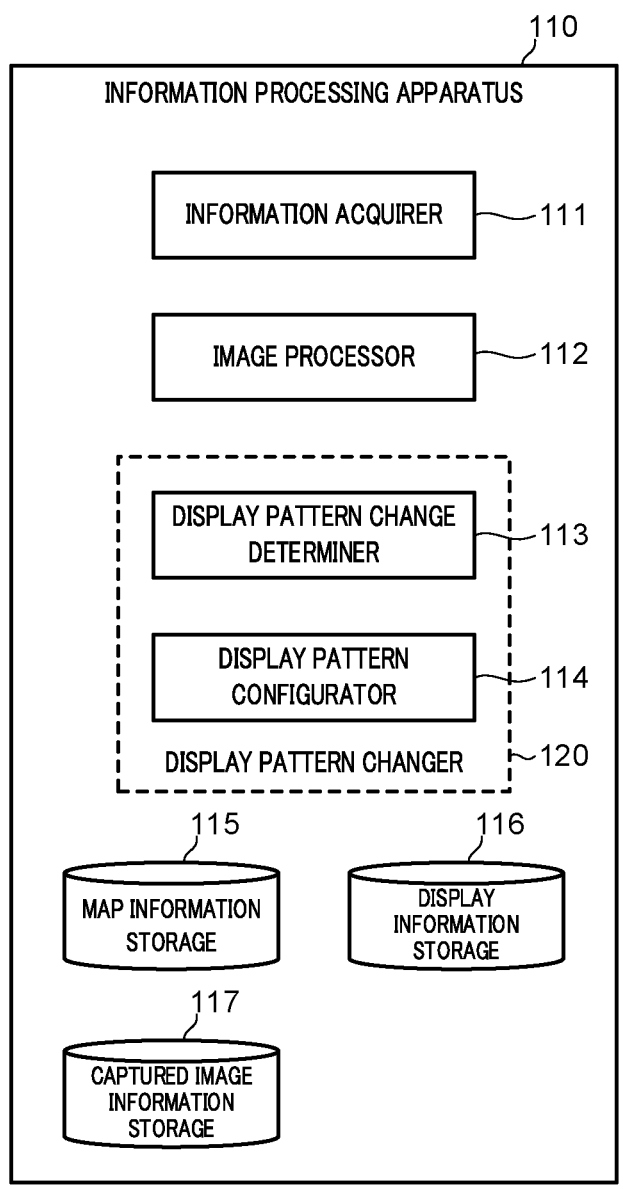
FIG. 3 illustrates an exemplary functional configuration of the information processing apparatus.

Next, an exemplary functional configuration of information processing apparatus 110 will be described with reference to FIG. 3. FIG. 3 illustrates the exemplary functional configuration of the information processing apparatus. Information processing apparatus 110 includes information acquirer 111 that acquires traveling information, the captured image information, etc., image processor 112 that performs various kinds of processing on an image captured by image capture 15 based on the captured image information, and display pattern changer 120 that changes a display pattern of display information on display 16 (e.g., speedometer of on-board meter panel) according to change in the traveling information. The traveling information is, for example, the vehicle information described above, current time information, information on the weather around the current position of vehicle 100, traffic information, information indicating a vehicle traveling mode, and information on a user attribute. Details of image processor 112 and display pattern changer 120 will be described later.

Information processing apparatus 110 also includes map information storage 115, display information storage 116, and captured image information storage 117 that stores the captured image information transmitted from image capture 15.

Map information storage 115 stores map information such as a dynamic map and 3D high-definition map. Utilizing the map information and the vehicle position information, for example, enables accurate speed limit display corresponding to the current position of vehicle 100 in speed limit display processing, which will be described later.

Display information storage 116 stores display information displayed on display 16. The display information is, for example, image information of a speedometer, oil pressure meter, and fuel level meter displayed on the on-board meter panel, or image information of a speed limit of a road on which vehicle 100 travels.

The display information also includes color tone information indicating a color tone of some areas of the on-board meter panel. The color tone information may be, for example, a color of the back area of the on-board meter panel, a color of a speed area (numeric section) of the speedometer displayed on the on-board meter panel, a color of a needle of the speedometer, and a color of all or part of the area of the speedometer. The color tone is tone of color, density of color, etc. To be more specific, the color tone is, for example, the density or type of the color generated by the speedometer according to the traveling condition or surrounding environment of vehicle 100. Note that the density or type of the color may be changed in gradation. The gradation indicates that a color tone changes continuously according to the traveling condition or surrounding environment of vehicle 100. For example, in a case of continuously or gradually changing the color generated by the speedometer as it gradually becomes brighter around vehicle 100 between the time before sunrise (e.g., 5:00 am) and a specific time (e.g., 8:00 am) in clear weather, a plurality of densities and types of colors (colors within a specific range of Munsell hue circle) corresponding to clear weather are configured for the time period from 5:00 am to 8:00 am.

The display information is associated with a plurality of the traveling information portions in display information storage 116. For example, the image information of the speedometer, the image information of a speed limit, and the color tone of some areas of the on-board meter panel are associated with each of the time, vehicle speed (e.g., 10 km/h, 50 km/h, etc.), weather (e.g., clear weather, cloudy weather, rainy weather, etc.), vehicle condition (e.g., stopping, traveling, etc.), and user attribute (e.g., elderly, young, gender, etc.).

By analyzing the captured image information stored in captured image information storage 117, image processor 112 specifies the direction of a person's line of sight, and inputs line-of-sight information indicating the specified direction of the line of sight to display pattern changer 120.

By analyzing the captured image information stored in captured image information storage 117, image processor 112 also specifies the position of an obstacle (e.g., steering part including a steering wheel) provided in front of display 16, and inputs obstacle position information indicating the specified position of the obstacle to display pattern changer 120.

In addition, by analyzing the captured image information stored in captured image information storage 117, image processor 112 detects the color tone of the scenery around vehicle 100, and inputs color tone information indicating the color tone to display pattern changer 120.

Further, image processor 112 detects the speed limit by analyzing the captured image information captured by the outside image capture, and inputs speed limit information indicating the speed limit to display pattern changer 120.

Display pattern changer 120 includes display pattern change determiner 113 and display pattern configurator 114.

Display pattern change determiner 113 inputs the line-of-sight information, obstacle position information, and color tone information from image processor 112, the traveling information acquired by information acquirer 111, the display information stored in display information storage 116, and the map information stored in map information storage 115. Display pattern change determiner 113 determines whether to change a display pattern of the display information displayed on display 16 by using such information, a predetermined change condition, and a user (e.g., driver) preferred display condition.

The change condition includes, for example, the presence of the steering wheel on the person's line of sight to the speedometer of display 16, the vehicle speed exceeding a predetermined set value, the vehicle speed exceeding the speed limit, and the latest speed limit acquired in chronological order changed from the speed limit previously acquired.

The user preferred display condition includes changing the rotation angle of the speedometer, displaying the enlarged speedometer, changing the position of a part (specific speed zone) of the speedometer, changing the display pattern when traveling on a highway while not changing the display pattern when traveling in an urban area, changing the display pattern when traveling in an urban area while not changing the display pattern when traveling on a highway, and the like. These display conditions may be configured, for example, by the driver inputting on a setting screen on a touchscreen when vehicle 100 starts traveling, or may be configured in advance in memory device 11B and read out from memory device 11B each time vehicle 100 starts traveling.

The change of the display pattern includes, for example, changing the position, size, color, etc. of images of the speedometer and the needle in the speedometer, and changing the color tone of a part of the on-board meter panel. The change of the display pattern also includes, for example, changing the state of the speed limit image from invisible to visible, changing the state of the speed limit image from visible to invisible, and changing the type of the speed limit image.

Display pattern configurator 114 configures the display pattern to be displayed on display 16 in accordance with the determination result by display pattern change determiner 113, reads the image information corresponding to the configured display pattern from display information storage 116, and inputs the read display information to display 16. This allows the display pattern of the display information (displayed image) on display 16 to be changed in accordance with the change in the traveling information.

Figure 4:
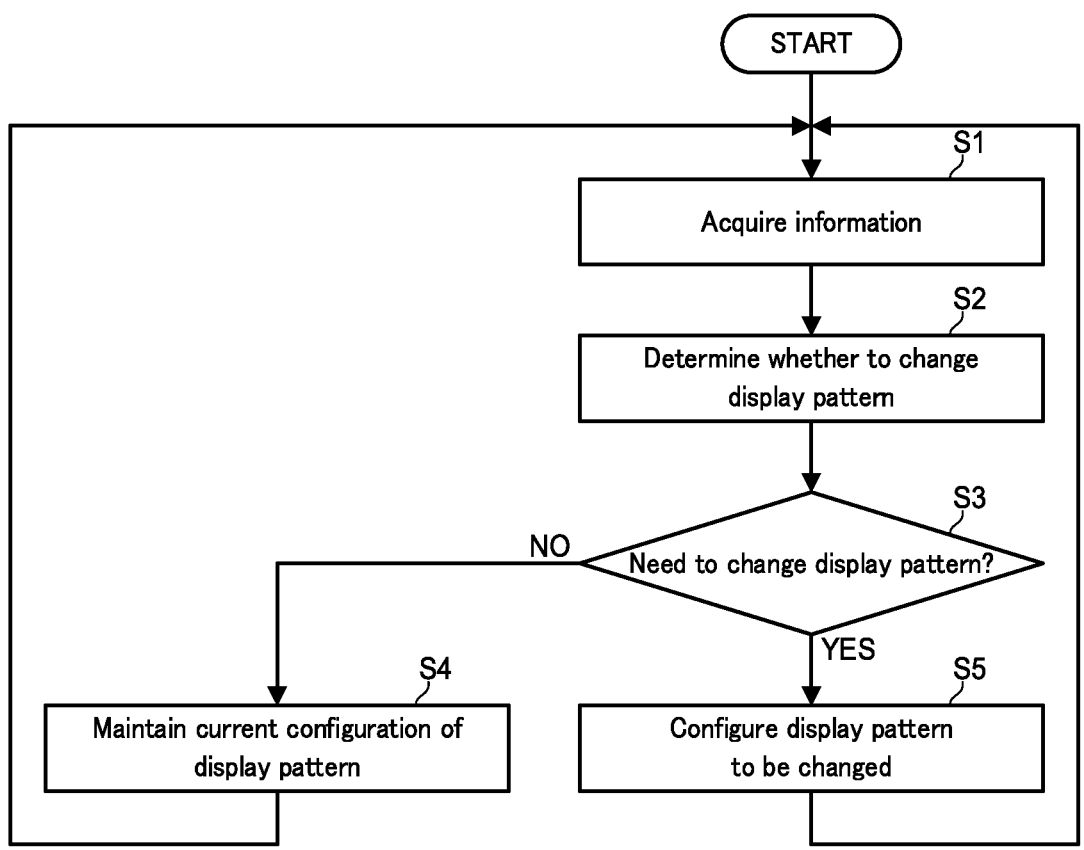
FIG. 4 is a flowchart for describing an operation of the information processing apparatus.

Next, a description will be given of the outline of an operation of changing the display pattern by the information processing apparatus with reference to FIG. 4. FIG. 4 is a flowchart for describing the operation of the information processing apparatus.

Information processing apparatus 110 acquires the traveling information, captured image information, and the like (step S1), and determines whether to change the display pattern of the display information displayed on display 16 using such information and the above-described change condition (step S2). When the display pattern of the display information need not be changed (No in step S3), information processing apparatus 110 maintains the display pattern configuration of the display information that is currently displayed (step S4), and when the display pattern of the display information needs to be changed (Yes in step S3), information processing apparatus 110 configures the display pattern that is changed according to the above-described display condition (step S5).

Next, specific examples of the operation of changing the display pattern will be described with reference to FIG. 5 and the like.

(Method of Changing Display Pattern of Speedometer)

Figure 5:
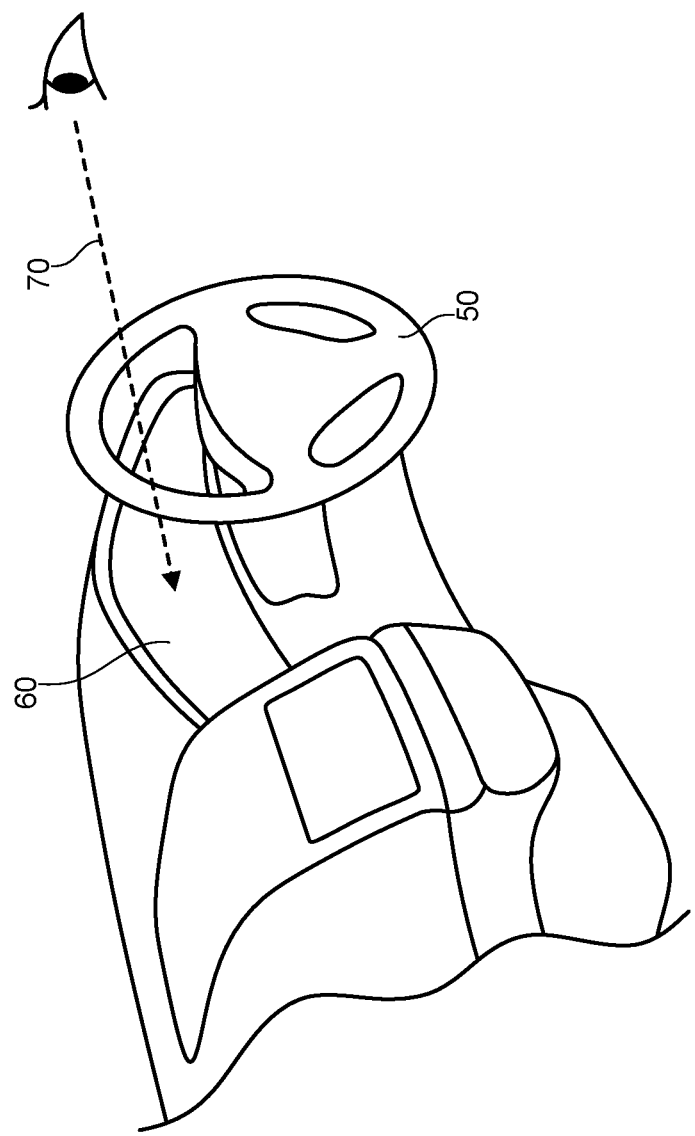
FIG. 5 is a diagram for describing a situation where a steering wheel placed in front of an on-board meter panel blocks a driver's line of sight to a speedometer.

FIG. 5 is a diagram for describing a situation where the steering wheel placed in front of the on-board meter panel blocks a driver's line of sight to the speedometer. When steering wheel 50 blocks a driver's line of sight 70 to on-board meter panel 60, it is sometimes difficult to see a part of the speedometer displayed on on-board meter panel 60.

For example, when vehicle 100 travels in an urban area, the vehicle speed is often in a low speed zone (first speed zone) of 60 km/h or less, for example. At this time, when steering wheel 50 blocks the first speed zone on the left side of the speedometer, the driver needs to adjust the position of steering wheel 50 using a tilt mechanism of steering wheel 50 so as to visually recognize the first speed zone of the speedometer, or needs to tilt his/her head to shift the line of sight 70. Meanwhile, when vehicle 100 travels on a highway, the vehicle speed is often in a high speed zone (second speed zone) of 60 km/h or more, for example. At this time, when steering wheel 50 blocks the second speed zone on the upper side of the speedometer, similar to the above situation, the driver needs to adjust the tilt mechanism of steering wheel 50 or shift the line of sight 70. As described above, steering wheel 50 blocks different speed zones depending on the vehicle speed. Adjusting the position of steering wheel 50 makes the driver feel troublesome, and moving his/her head may interfere with safe driving, which are not preferred situations.

Information processing apparatus 110 according to the present embodiment is configured to change the display pattern of the image of the speedometer according to the traveling information, change condition, etc. so that steering wheel 50 does not block the vehicle speed and the vehicle speed is visible without the driver adjusting the tilt or moving his/her head. Examples of changing the display pattern will be described in detail with reference to FIGS. 6 to 9.

Figure 6:
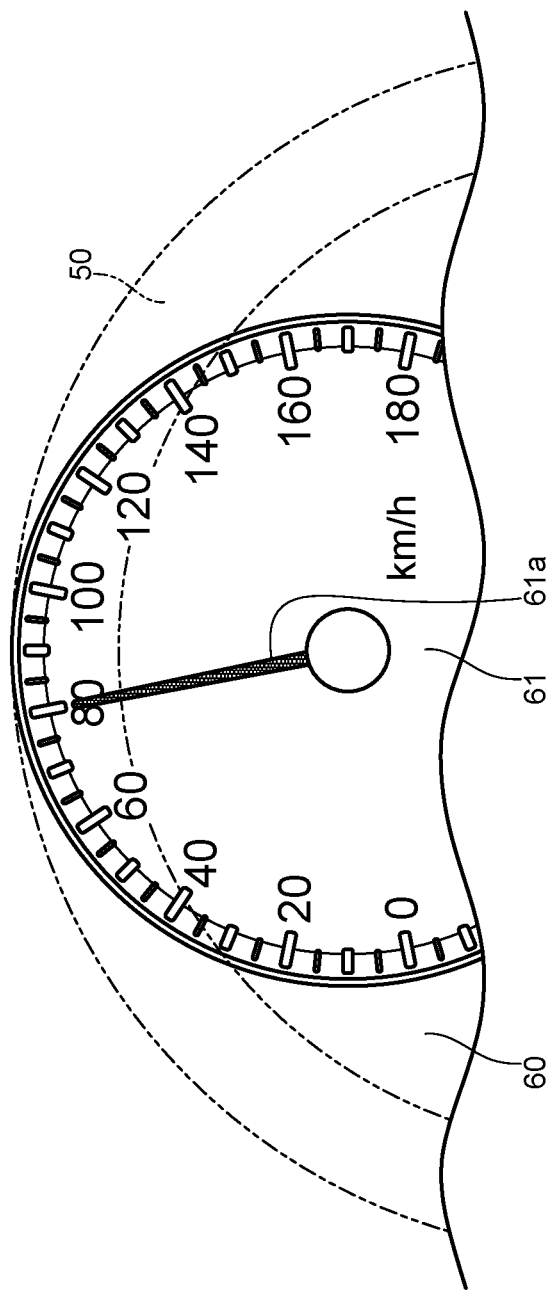
FIG. 6 is a diagram for describing a situation where the steering wheel blocks the line of sight to a second speed zone of the speedometer.

FIG. 6 is a diagram for describing a situation where the steering wheel blocks the line of sight to the second speed zone of the speedometer. FIG. 6 illustrates a situation where a circular rim section of steering wheel 50 blocks the driver's line of sight to the upper speed zone (second speed zone) of speedometer 61 displayed on on-board meter panel 60. The zone from 60 km/h to 120 km/h of speedometer 61 and the tip of needle 61a of speedometer 61 are hidden behind the rim section of steering wheel 50, and thus a driver cannot accurately determine the current vehicle speed.

In this case, information processing apparatus 110 changes the display pattern of speedometer 61 as follows. The line of sight to the upper speed zone of speedometer 61 can be determined by analyzing an image captured by an inside image capture (e.g., stereo camera) to determine the line-of-sight direction (line-of-sight vector) and giving a starting point based on the eye position of the driver to the line-of-sight direction. To be more specific, image processor 112 identifies the eye area from a three-dimensional image of the driver's face captured by the stereo camera, stereoscopically views the eye shape, and determines the eye center coordinates from the curvature. Further, image processor 112 specifies the black eye (pupil) area from the eye area to determine the black eye center coordinates, and determines the direction from the eye center coordinates to the black eye center coordinates as the line-of-sight direction (line-of-sight vector). Image processor 112 uses the eye position as the starting point, and specifies the straight line extending from the starting point in the line-of-sight direction as the line of sight.

The position of steering wheel 50, which blocks the driver's line of sight, can be identified by analyzing a three-dimensional image captured by the stereo camera, and estimating a distance from a reference position, which is the front of display 16 for example, to each section of steering wheel 50.

Information processing apparatus 110 determines whether steering wheel 50 is present on the driver's line of sight to the speed zone corresponding to the vehicle speed based on information on the line of sight, information on the position of steering wheel 50, and information on the current vehicle speed. For example, in a case where the vehicle speed is 30 km/h, it can be determined that no part of steering wheel 50 is present on the line of sight to the vicinity of 30 km/h even when steering wheel 50 is placed as illustrated in FIG. 6. In this case, information processing apparatus 110 does not change the display pattern of speedometer 61 and maintains the current display pattern.

Meanwhile, in a case where the vehicle speed is 80 km/h, for example, it can be determined that a part of steering wheel 50 is present on the driver's line of sight to the second speed zone including 80 km/h when steering wheel 50 is placed as illustrated in FIG. 6. In this case, information processing apparatus 110 changes the display pattern of speedometer 61 as illustrated in FIG. 7 according to the display condition described above.

Figure 7:
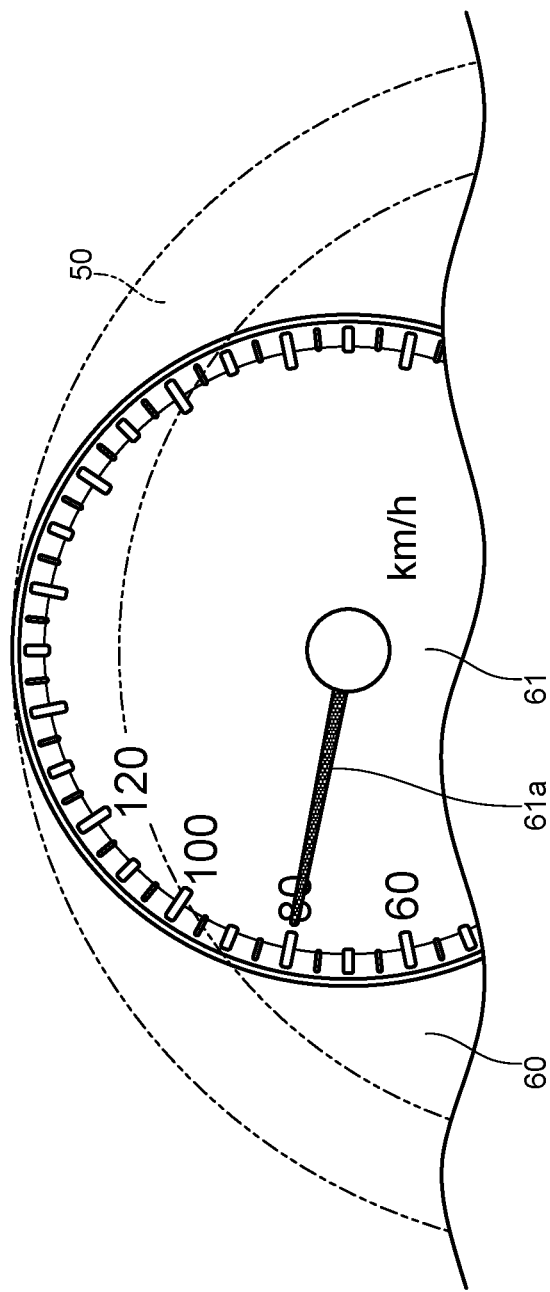
FIG. 7 illustrates an example where the second speed zone is moved to a position easily visible to the driver.

FIG. 7 illustrates an example where the second speed zone is moved to a position easily visible to the driver. For example, FIG. 7 illustrates an exemplary display in a case where a change condition of changing the display pattern while traveling on a highway and changing the position of a part (specific speed zone) of on-board meter panel 60 is selected.

In on-board meter panel 60 illustrated in FIG. 7, an image of the second speed zone is displayed on the left side of speedometer 61, and needle 61a of speedometer 61 is changed to an image indicating the second speed zone. This prevents steering wheel 50 from blocking the second speed zone and the tip of needle 61a of speedometer 61, so that the driver can see the vehicle speed around the second speed zone without adjusting the tilt or moving his/her head. Note that the image is changed to the image illustrated in FIG. 6 when the vehicle speed is reduced down to the speed zone of, for example, 60 km/h or less from the state of display in FIG. 7.

The visibility may be deteriorated when the display pattern of the image of speedometer 61 is frequently switched according to the change in the vehicle speed. In view of this, information processing apparatus 110 may be configured to continuously display the image as illustrated in FIG. 7 without changing back to the image as illustrated in FIG. 6 when traveling on a highway, for example, even though the vehicle speed is temporarily (e.g., several seconds to several tens of seconds) reduced due to another vehicle cutting in or the like.

Information processing apparatus 110 may also be configured to change the image back to the image as illustrated in FIG. 6 even on a highway only when the vehicle is present within an area from a location where the vehicle speed is reduced (e.g., rest area and interchange) to a position a certain distance away from the location, for example.

Figure 8:
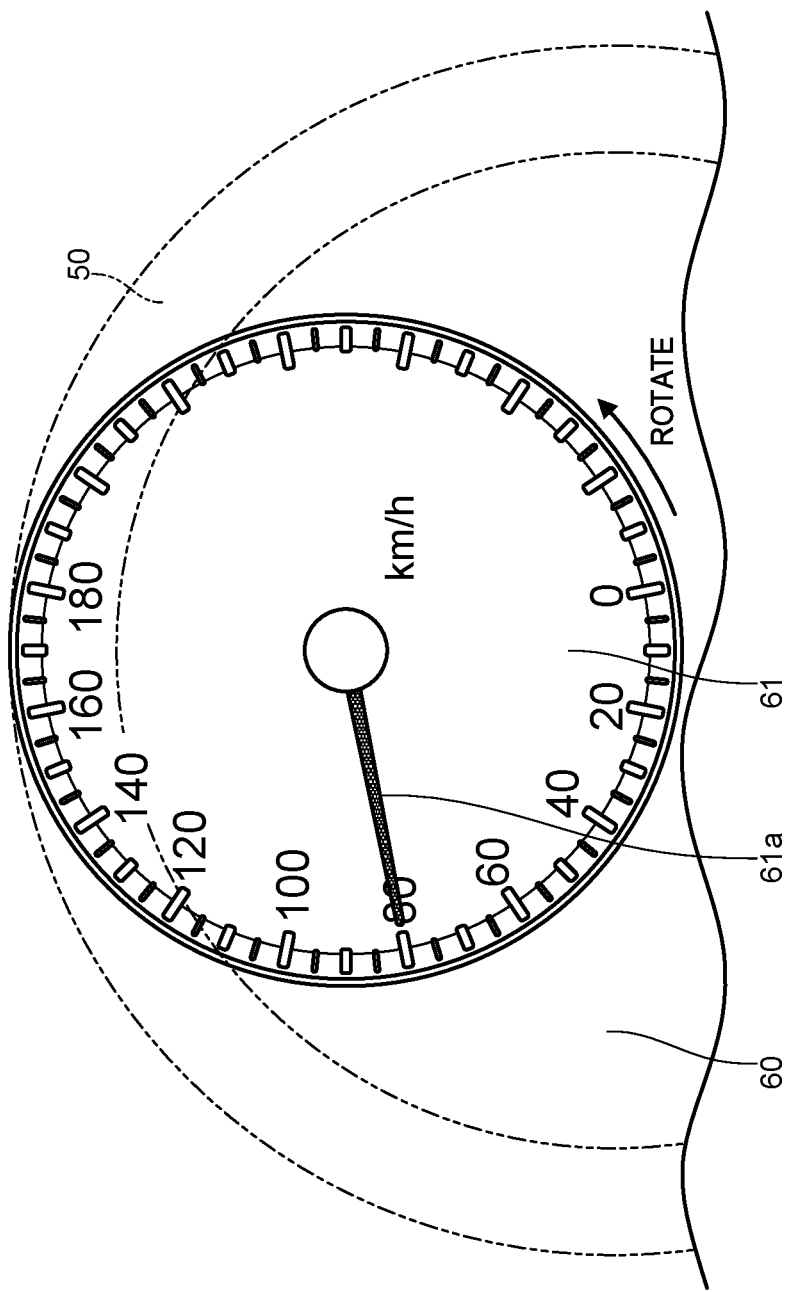
FIG. 8 illustrates an exemplary display of the entire speedometer rotated by a certain angle counterclockwise.

Other examples of changing the display pattern of the speedometer will be described with reference to FIG. 8 and FIG. 9. FIG. 8 illustrates an exemplary display of the entire speedometer rotated by a certain angle counterclockwise. As illustrated in FIG. 8, by rotating the entire speedometer, not only the first speed zone but also a part of the second speed zone are not blocked by steering wheel 50, so that the driver can clearly grasp the current vehicle speed and the speed zones adjacent to the vehicle speed. In addition, displaying in this manner prevents the display pattern of the image of speedometer 61 from being frequently switched according to the change in the vehicle speed even when the vehicle speed fluctuates, thereby preventing deterioration of the visibility of speedometer 61 due to the change in the display pattern. Note that the rotation direction of speedometer 61 is not limited to the counterclockwise direction, and may be the clockwise direction.

Figure 9:
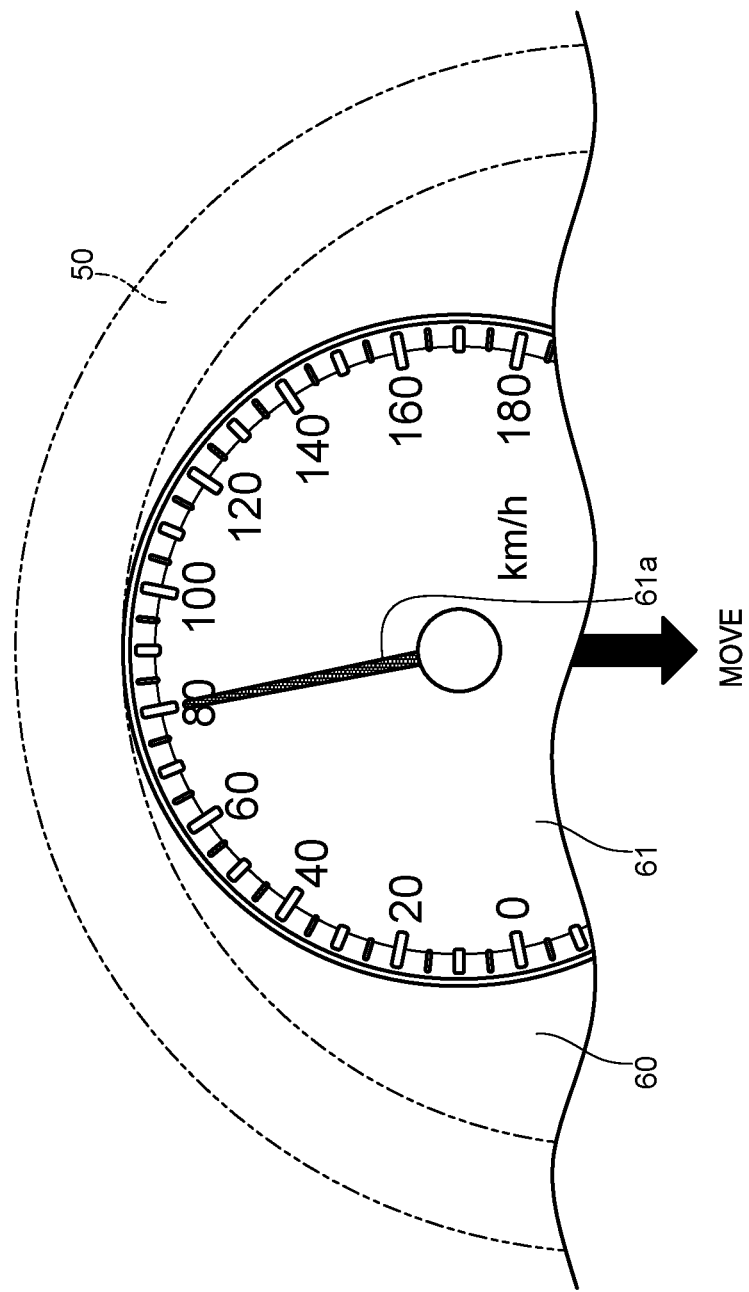
FIG. 9 illustrates an exemplary display of the entire speedometer moved toward the lower side of the on-board meter panel.

FIG. 9 illustrates an exemplary display of the entire speedometer moved toward the lower side of the on-board meter panel. As illustrated in FIG. 9, by moving entire speedometer 61 to the lower side of on-board meter panel 60, the entire first speed zone and second speed zone are not blocked by steering wheel 50, so that the driver can clearly grasp the current vehicle speed and the speed zones adjacent to the vehicle speed. Further, in a case where the display pattern is changed in this manner, the positions of the first speed zone and second speed zone, and the tilt of needle 61a, for example, are not changed before and after the change of the display images; accordingly, it is easier to see speedometer 61. Note that this change of the display pattern is particularly useful when the circular rim section of steering wheel 50 has a large gap inside. Note that the moving direction of speedometer 61 is not limited to the lower direction of on-board meter panel 60, and may be any of the upper, right, and left directions of on-board meter panel 60.

In addition to the above, information processing apparatus 110 may be configured to change the position of the entire speedometer according to the rotation angle of steering wheel 50. In a case where the vehicle travels on a mountain road with a series of curves, for example, the steering wheel is frequently manipulated. Thus, the image of speedometer 61 can be displayed in a position easily visible to the driver by, for example, pre-configuring the display information of speedometer 61 that corresponds to the steering direction and the steering amount of steering wheel 50 to display information storage 116, and reading the display information of speedometer 61 that corresponds to the steering direction and the steering amount of steering wheel 50 by display pattern changer 120. This allows the driver to accurately confirm speedometer 61 even when the vehicle is traveling on curves, thereby reducing driver fatigue. Further, by linking the position of the image of speedometer 61 to the steering direction, the image of speedometer 61 can be displayed close to the line of sight even when the line of sight is directed to the end of a curved road, thereby reducing the amount of eye movement between speedometer 61 and the road, reducing driver fatigue, and contributing to driver's safe driving.

Further, information processing apparatus 110 may be configured to perform display control based on the user preferred display condition described above and the traveling information. The display control includes, for example, changing the rotation angle of the speedometer, displaying the enlarged speedometer, changing the position of a part (specific speed zone) of the speedometer, changing the display pattern when traveling on a highway while not changing the display pattern when traveling in an urban area, changing the display pattern when traveling in an urban area while not changing the display pattern when traveling on a highway, and the like.

(Method of Changing Display Pattern of Speed Limit)

Next, a description will be given of examples of displaying, on speedometer 61, an image for a speed limit of a road on which the vehicle travels, and changing the display pattern of the speed limit image in accordance with the change in the vehicle speed, with reference to FIG. 10 and FIG. 11.

Figure 10:
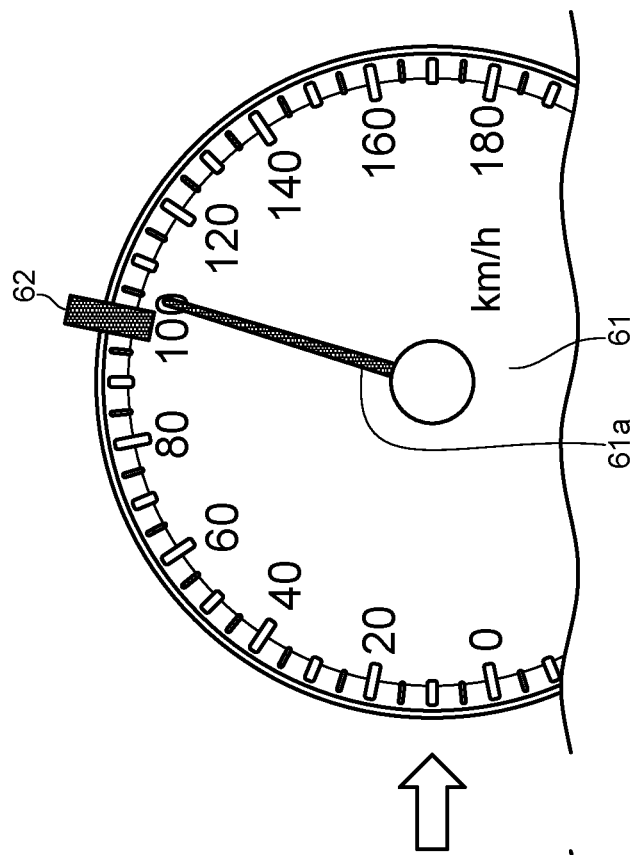
FIG. 10 illustrates exemplary images for a speed limit displayed on the speedometer.
Figure 10:
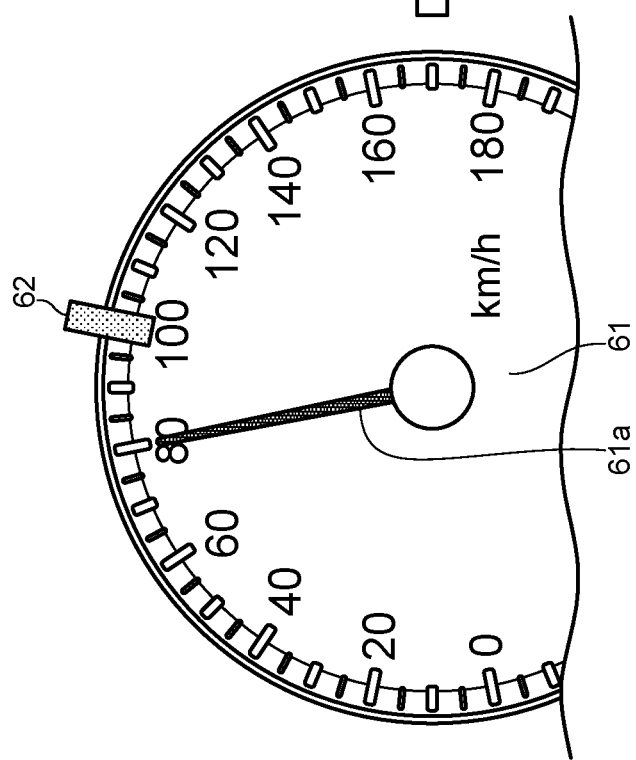
Figure 11:
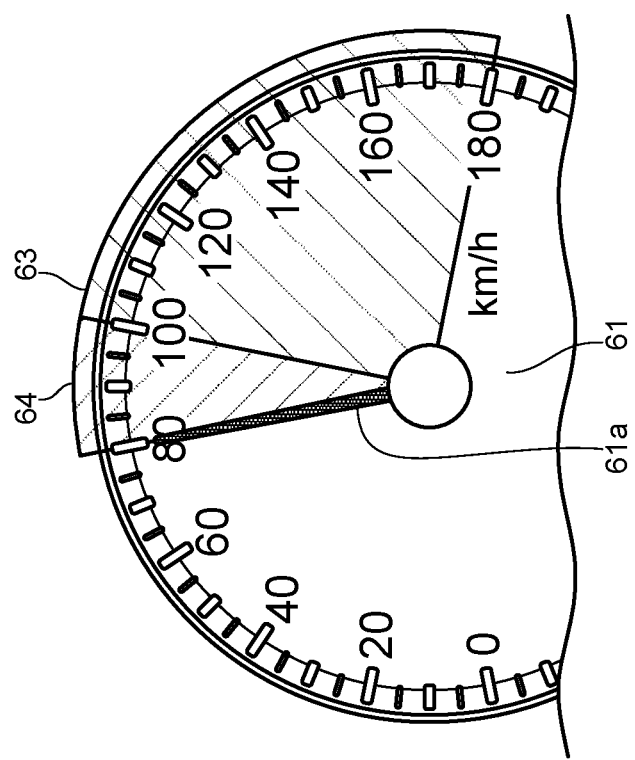
FIG. 11 illustrates a variation of the image for a speed limit displayed on the speedometer.

FIG. 10 illustrates exemplary speed limit images displayed on the speedometer. As illustrated in FIG. 10, bar image 62 for a speed limit (e.g., 100 km/h) is superimposed on the image indicating speeds of speedometer 61. Speed limit image 62 on the left side of FIG. 10 indicates that the vehicle speed is equal to or lower than the speed limit, and speed limit image 62 on the right side of FIG. 10 indicates that the vehicle speed exceeds the speed limit.

Display pattern changer 120 acquires information on the speed limit of the road on which vehicle 100 is currently traveling. When the vehicle speed is equal to or lower than the speed limit, display pattern changer 120 reads image information corresponding to the speed from display information storage 116, and displays speed limit image 62 as illustrated on the left side of FIG. 10 on speedometer 61 based on the image information. Speed limit image 62 in this case is configured to be, for example, green in the lit state. Note that the methods to be applied to acquire the information on the speed limit include, for example, a method of utilizing the speed limit linked to a dynamic map, and a method of reading an image of the speed limit on the road by an image capturing device as disclosed in Patent Literature (e.g., Japanese Patent Application Laid-Open No 2018-081555, etc.).

When the vehicle speed exceeds the speed limit, display pattern changer 120 reads image information corresponding to the speed from display information storage 116, and displays speed limit image 62 as illustrated on the right side of FIG. 10 on speedometer 61 based on the image information. Speed limit image 62 in this case is configured to be, for example, red in the flashing state.

Displaying speed limit image 62 on speedometer 61 in this manner allows a driver to grasp the speed limit of the traveling road by looking at speedometer 61 without watching a speed limit sign on the road. In addition, it is not necessary to compare a speed limit sign with the vehicle speed on speedometer 61, and this eliminates eye movement between the speed limit sign and speedometer 61, thereby reducing driver fatigue and contributing to driver's safe driving.

Note that the color of speed limit image 62 before and after exceeding the speed limit is not limited to the above example, and may be the same color having different densities or the same color having a different flashing cycle before and after the vehicle speed exceeds the speed limit, for example.

Further, speed limit image 62 is not limited to a bar-shaped image, and may be an image covering the entire speed zone exceeding the speed limit, for example. An example of such a display will be described with reference to FIG. 11. FIG. 11 illustrates a variation of the speed limit image displayed on the speedometer.

For example, in a case where the speed limit is 80 km/h, display pattern changer 120 reads image information corresponding to the speed limit from display information storage 116, and displays image 64 covering all or a part of the speed zone exceeding 80 km/h on speedometer 61 based on the image information.

Meanwhile, in a case where the speed limit is changed from 80 km/h to 100 km/h, for example, display pattern changer 120 reads image information corresponding to the speed limit from display information storage 116, and displays image 63 covering all or a part of the speed zone exceeding 100 km/h on speedometer 61 based on the image information.

At this time, it is preferable that display pattern changer 120 makes image 63 and image 64 in different colors from each other so that a speed zone exceeding the changed speed limit is clear. In addition to this, display pattern changer 120 may display image 63 after hiding image 64, or may display image 63 after hiding image 64 by continuously or gradually reducing the color density of image 64 over time, for example.

Further, display pattern changer 120 may change the color of the speed limit image according to the type of the road. For example, the speed limit image for ordinary roads is configured to be blue and the speed limit image corresponding to highway is configured to be red, so that the driver can easily grasp the speed limit different for each road.

(Method of Changing Display Pattern of Speedometer in Accordance with Change in Vehicle Surrounding Environment)

Next, a description will be given of examples of changing the display pattern of the speedometer in accordance with change in the surrounding environment of vehicle 100 with reference to FIG. 12 and FIG. 13.

Figure 12:
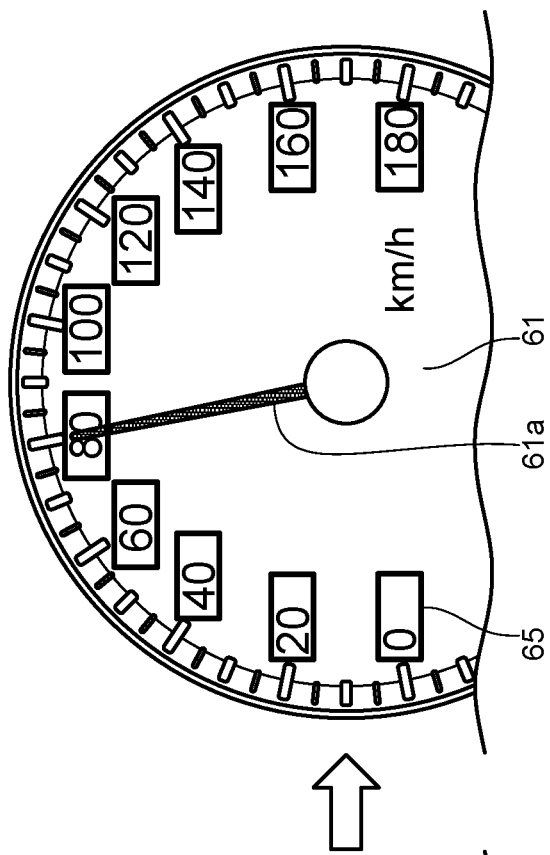
FIG. 12 is a diagram for describing an example of changing a display pattern of the speedometer in accordance with change in the surrounding environment of the vehicle.
Figure 12:
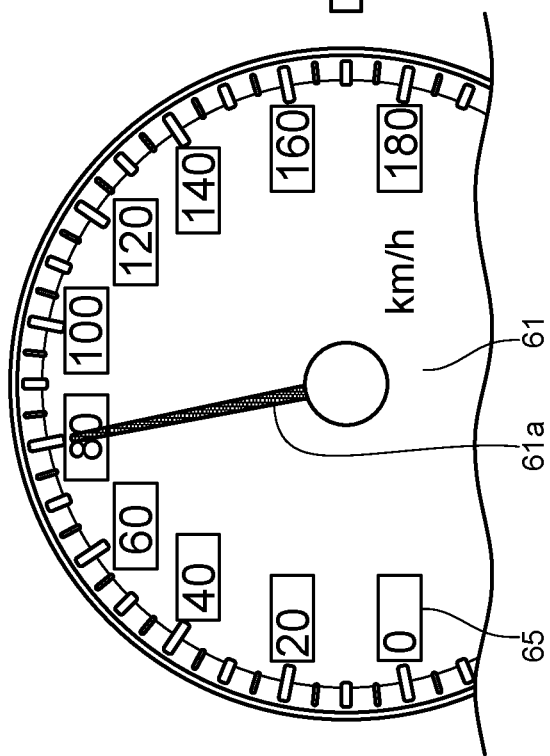

FIG. 12 is a diagram for describing an example of changing the display pattern of the speedometer in accordance with change in the surrounding environment of the vehicle. On the left side of FIG. 12, the image of speedometer 61 in rainy weather, for example, is illustrated. For example, display pattern changer 120 reads, from display information storage 116, image information corresponding to the color tone of the surrounding environment of vehicle 100 in rainy weather according to the input of color tone information from image processor 112, and configures, to speedometer 61, speed background color 65 of speedometer 61 as illustrated on the left side of FIG. 12 based on the image information. Background color 65 in this case is configured to be white, for example. This makes the image of speedometer 61 clear even when it is dark around vehicle 100, thus improving the driver's visibility.

On the right side of FIG. 12, the image of speedometer 61 in clear weather, for example, is illustrated. For example, display pattern changer 120 reads, from display information storage 116, image information corresponding to the color tone of the surrounding environment of vehicle 100 in clear weather according to the input of color tone information from image processor 112, and configures, to speedometer 61, speed background color 65 of speedometer 61 as illustrated on the right side of FIG. 12 based on the image information. Background color 65 in this case is configured to be blue, for example. The change of speed background color 65 of speedometer 61 to blue reduces the effect of sunlight even in a situation where it is difficult for a driver to see the white color due to strong sunlight shining through a windshield of vehicle 100 in the morning, for example, thereby greatly improving the visibility of speedometer 61. Note that the brightness of speedometer 61 can be controlled using the conventional art, but when the red light of sunset, for example, enters the driver's eyes or is reflected on speedometer 61, it is still difficult to see the red part of speedometer 61 by only controlling the brightness. Information processing apparatus 110 according to the present embodiment can change the color of speedometer 61 in accordance with the change in the surrounding environment of vehicle 100, thus improving the visibility of speedometer 61 and assisting driver's driving. It is particularly useful for elderly drivers who have difficulty in recognizing a color difference.

In addition to the weather, display pattern changer 120 may be configured to change the color of speedometer 61 in accordance with the time of day vehicle 100 travels. For example, strong sunlight possibly affects driving from 6:00 am to 8:00 am, and thus display pattern changer 120 may be configured to perform the above-described control (color change of speedometer 61) in the time period and not to perform the above-described control except for the time period. Further, when sunlight temporarily becomes stronger due to a break in the clouds in cloudy weather, for example, display pattern changer 120 may be configured not to perform the above-described control until a predetermined time (about several minutes) elapses from the timing at which the strength of sunlight exceeds a predetermined level, and to perform the above-described control when the predetermined time has elapsed. This configuration prevents frequent color change of speedometer 61 according to the change in the surrounding environment of vehicle 100, thereby preventing deterioration of the visibility.

In addition to the weather, display pattern changer 120 may also be configured to change the color of speedometer 61 in accordance with the attribute of an occupant of vehicle 100. For example, display pattern changer 120 may be configured to perform the above-described control when the determination result of a face image by image processor 112 is inputted and the driver is determined to be an elderly person of a predetermined age or more based on the face image, and may be configured not to perform the above-described control when the driver is determined not to be an elderly person. This configuration improves the visibility of speedometer 61 for the elderly, and allows people other than the elderly to concentrate on driving without feeling troublesome to the color change.

Further, display pattern changer 120 may be configured to change the color of speedometer 61 when the color difference between the color of the surrounding environment of vehicle 100 and the color of speedometer 61 is lower than a predetermined value. For example, information on the color of the surrounding environment of the vehicle can be taken into display pattern changer 120 by image processor 112 analyzing a captured image of the surrounding environment of the vehicle. Display pattern changer 120 determines the color of the surrounding environment of the vehicle based on the information on the color of the surrounding environment of the vehicle and information on Munsell hue circle, and compares the determined color with the color configured to speedometer 61 (e.g., speed background color 65 of speedometer 61 described above). This makes it possible to determine whether the difference in color values (color difference) is lower than the predetermined value. For example, it is difficult to see speedometer 61 when the red light of sunset is similar to speed background color 65 of speedometer 61, and thus display pattern changer 120 performs the above-described control when determining that the color difference is lower than the predetermined value. This prevents deterioration of the visibility of speedometer 61 due to the surrounding environment of vehicle 100 regardless of the age of the driver.

Display pattern changer 120 may change, instead of speed background color 65 of speedometer 61, one of the color of the speeds of speedometer 61 (color of speed values of speedometer 61), the color of the needle of speedometer 61, and the color of all or a part of areas of the background of speedometer 61.

Further, display pattern changer 120 may change the color of speedometer 61 taking into account the user preferred display condition. For example, display pattern changer 120 may change the color so as to incorporate more blue for those who can see blue well, and more green for those who can see green well.

(Method of Changing Display Pattern of Speedometer in Accordance with Traveling Mode)

Next, a description will be given of examples of changing the display pattern of the speedometer in accordance with a traveling more with reference to FIG. 13.

Figure 13:
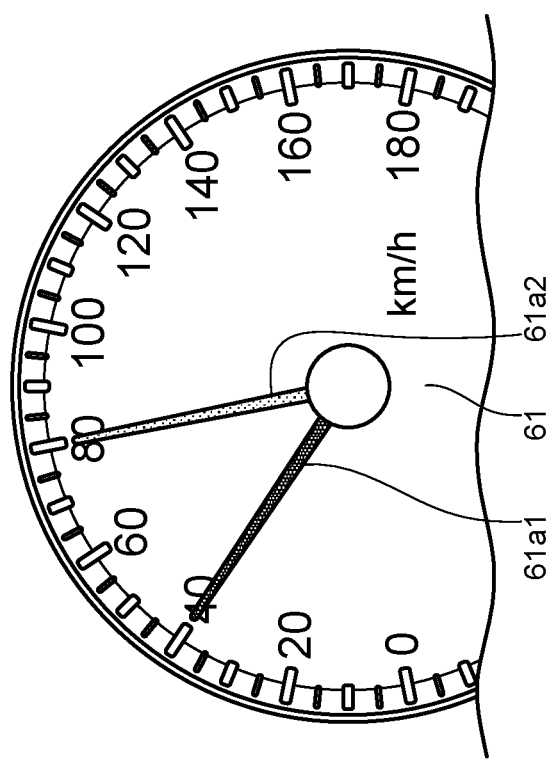
FIG. 13 illustrates an actual vehicle speed displayed while autonomous driving and a vehicle speed expected when the autonomous driving is switched to manual driving.

FIG. 13 illustrates an actual vehicle speed while traveling in an autonomous driving mode and a virtual vehicle speed expected when the autonomous driving mode is switched to a manual driving mode.

On speedometer 61 of vehicle 100 traveling in the autonomous driving mode, an image of needle 61a1 indicating the actual vehicle speed is displayed as illustrated in FIG. 13. When the driving mode is switched from the autonomous driving mode to the manual driving mode in such vehicle 100 traveling in the autonomous driving mode, the vehicle speed sometimes significantly diverges before and after the switching.

For example, even in a case where the current vehicle speed is 40 km/h, when the driving mode is switched from the autonomous driving mode to the manual driving mode while the accelerator pedal is strongly depressed and the vehicle speed corresponding to the accelerator position is 80 km/h, for example, there is a risk of a sudden increase in the vehicle speed and a rear-end collision with a vehicle ahead.

Also, for example, even in a case where the current vehicle speed is 100 km/h, when the driving mode is switched from the autonomous driving mode to the manual driving mode while a foot is just put on the accelerator pedal and the vehicle speed corresponding to the accelerator position is 10 km/h, for example, the vehicle speed suddenly drops and the distance between the vehicle and the following vehicle is shortened, which is dangerous.

In view of this, for example, in the prior art disclosed in Patent Literature (Japanese Patent Application Laid-Open No 2007-196809), a driving operation by a driver is compared with a driving operation determined to be optimal by an autonomous driving control apparatus from the timing at which the driver makes a request to cancel the autonomous driving until the manual driving takes over, and when it is determined that the driver can perform proper driving, it switches to the manual driving. In the prior art, however, it is impossible to (visually) grasp how far the operation amount of the driver is diverged from the current traveling state, and thus driver's fear of sudden acceleration or deceleration after switching to the manual driving cannot be dispelled. This causes a problem of not switching to the manual driving.

Considering the above, display pattern changer 120 according to the present embodiment inputs, for example, mode switching information from a mode switching switch that switches the driving mode, and displays the current vehicle speed on speedometer 61 when it is determined that the current driving mode is the autonomous driving mode based on the inputted mode switching information. In addition, display pattern changer 120 estimates the vehicle speed corresponding to the accelerator position based on the traveling information described above. For the estimation of the vehicle speed corresponding to the acceleration position, table information that associates the accelerator position with the vehicle speed is used, for example. Display pattern changer 120 reads image information of the needle for the vehicle speed corresponding to the estimated vehicle speed from display information storage 116, and displays the image of needle 61a2 indicating the virtual vehicle speed on speedometer 61 in addition to the image of needle 61a1 indicating the actual vehicle speed, as illustrated in FIG. 13. This makes it possible to display, besides the vehicle speed during the autonomous driving, the vehicle speed that is expected when switched to the manual driving. Accordingly, the driver can confirm the difference between the current vehicle speed and the vehicle speed when switched to the manual driving, and when the speed difference is about 10 km/h, for example, the driver can switch the driving mode without adjusting the accelerator position. When the speed difference exceeds 10 km/h, the driver can switch the driving mode after reducing the speed difference by adjusting the accelerator position while looking at the image of needle 61a2 indicating the above-described virtual vehicle speed. Note that display pattern changer 120 may be configured not only to display the vehicle speed that is expected when switched to the manual driving, but also to display information on the expected vehicle speed, such as the difference from the vehicle speed during the autonomous driving and an alert indicating that the vehicle speed difference is too large.

Note that information processing apparatus 110 according to the present embodiment may be configured to display the display information displayed on on-board meter panel 60 on a head-up display and change the display pattern on the head-up display. In this case, the change of the display information can be implemented by controlling the optical path length, controlling the optical path direction, and the like. For example, when changing the display pattern of an image such as a speedometer displayed on the head-up display, display pattern changer 120 outputs a command to a head-up unit to control the operation of an optical system. The head-up unit includes an emitter and the optical system. The emitter is a projector that emits light. The optical system is a component that reflects the light emitted by the emitter and projects the light toward a predetermined area of the display provided on a windshield. The optical system is composed of, for example, a concave mirror, a plurality of lenses, a mirror, etc. The light emitted from the emitter is projected onto the display through the optical system, and this forms a virtual image of the speedometer, for example, in front of the windshield.

While various embodiments have been described with reference to the drawings herein above, the present disclosure is obviously not limited to these examples. Obviously, a person skilled in the art would conceive variations and modification examples within the scope described in the claims, and it is to be appreciated that these variations and modifications naturally fall within the technical scope of the present disclosure. Each constituent element of the above-mentioned embodiments may be combined optionally without departing from the spirit of the disclosure.

Although specific examples of the present embodiment have been described in detail, those are merely examples and it is not intended to limit the scope of the claims. The techniques described in the claims include variations and modifications of the specific examples described above.

While various embodiments have been described herein above, it is to be appreciated that various changes in form and detail may be made without departing from the spirit and scope of the invension(s) presently or hereafter claimed.

This application is entitled and claims the benefit of Japanese Patent Application No. 2020-046494, filed on Mar.

17, 2020, the disclosure of which including the specification, drawings and abstract is incorporated herein by reference in its entirety.

INDUSTRIAL APPLICABILITY

An exemplary embodiment of the present disclosure is suitable for an information processing apparatus and a vehicle.

REFERENCE SIGNS LIST

1 On-board device
60 On-board meter panel
61 Speedometer
100 Vehicle
110 Information processing apparatus
111 Information acquirer
112 Image processor
113 Display pattern change determiner
114 Display pattern configurator
120 Display pattern changer

The invention claimed is:

1. An information processing apparatus, comprising:
a memory device that stores a program,
one or more processors that execute the program,
wherein, by executing the program, the one or more processors:
acquire traveling information including vehicle speed on traveling of a vehicle having an on-board meter panel;
determine, based on the traveling information, whether a steering wheel is present on a line of sight of a person toward a speed zone, corresponding to the vehicle speed, of a speedometer of the on-board meter panel due to change in the vehicle speed; and
change a display pattern of the speedometer so that the steering wheel does not block the speed zone when the steering wheel is present on the line of sight.

2. The information processing apparatus according to claim 1, wherein the one or more processors move a position of the speed zone of the speedometer that is on the line of sight and blocked by the steering wheel to a position where the steering wheel does not block.

3. The information processing apparatus according to claim 1, wherein the one or more processors enlarge the speed zone of the speedometer that is on the line of sight and blocked by the steering wheel.

4. The information processing apparatus according to claim 1, wherein the one or more processors rotate an entire portion of the speedometer by a certain angle in a clockwise direction or a counterclockwise direction.

5. The information processing apparatus according to claim 1, wherein the one or more processors move a position of an entire portion of the speedometer relative to the steering wheel.

6. The information processing apparatus according to claim 1, wherein one or more processors display, on the speedometer of the on-board meter panel, a speed limit of a road on which the vehicle travels, and change a display pattern of the speed limit in accordance with change in a vehicle speed, which is the traveling information.

7. The information processing apparatus according to claim 6, wherein, when the vehicle speed exceeds the speed limit, the one or more processors configure a display pattern of the speed limit after the vehicle speed exceeds the speed limit to be different from a display pattern of the speed limit before the vehicle speed exceeds the speed limit.

8. The information processing apparatus according to claim 1, wherein, when a speed limit of a road on which the vehicle travels changes, the one or more processors display an area exceeding the speed limit on the speedometer of the on-board peter meter panel.

9. The information processing apparatus according to claim 8, wherein the one or more processors configure a color of the area exceeding the speed limit to be different before and after the speed limit changes.

10. The information processing apparatus according to claim 1, wherein the one or more processors change a color of the on-board meter panel in accordance with change in information indicating a surrounding environment of the vehicle, the information being the traveling information.

11. The information processing apparatus according to claim 10, wherein the processor changes the color of the on-board meter panel in accordance with change in weather around the vehicle.

12. The information processing apparatus according to claim 11, wherein the one or more processors change the color of the on-board meter panel in accordance with a time period in which the vehicle travels in addition to the weather.

13. The information processing apparatus according to claim 11, wherein the one or more processors change the color of the on-board meter panel in accordance with an attribute of an occupant of the vehicle in addition to the weather.

14. The information processing apparatus according to claim 10, wherein the one or more processors change the color of the on-board meter panel when a color difference between a color outside the vehicle and a color of the on-board meter panel is lower than a predetermined value.

15. The information processing apparatus according to claim 1, wherein the one or more processors display, on the speedometer of the on-board meter panel, information on an expected vehicle speed corresponding to an accelerator position when autonomous driving is switched to manual driving.

16. A vehicle comprising the information processing apparatus according to claim 1.

17. An information processing method performed by one or more processors, the method comprising:
acquiring traveling information including vehicle speed on traveling of a vehicle having an on-board meter panel;
determining, based on the traveling information, whether a steering wheel is present on a line of sight of a person toward a speed zone, corresponding to the vehicle speed, of a speedometer of the on-board meter panel due to change in the vehicle speed; and
changing a display pattern of the speedometer so that the steering wheel does not block the speed zone when the steering wheel is present on the line of sight.

* * * * *